Feb. 25, 1930.  W. C. NEIN  1,748,919
TRAIN CONTROL AND SIGNALING DEVICE
Original Filed Jan. 8, 1916   3 Sheets-Sheet 1

INVENTOR
W. C. Nein

BY
Thomas Howe
his ATTORNEY

Feb. 25, 1930. W. C. NEIN 1,748,919
TRAIN CONTROL AND SIGNALING DEVICE
Original Filed Jan. 8, 1916   3 Sheets-Sheet 2

W. C. Nein INVENTOR
BY Thomas Howe
his ATTORNEY

Feb. 25, 1930.  W. C. NEIN  1,748,919
TRAIN CONTROL AND SIGNALING DEVICE
Original Filed Jan. 8, 1916  3 Sheets-Sheet 3

W. C. Nein, INVENTOR
BY Thomas Howe, his ATTORNEY

Patented Feb. 25, 1930

1,748,919

UNITED STATES PATENT OFFICE

WILLIAM C. NEIN, OF SEWICKLEY, PENNSYLVANIA, ASSIGNOR TO GENERAL RAILWAY SIGNAL COMPANY, OF ROCHESTER, NEW YORK, A CORPORATION OF NEW YORK

TRAIN CONTROL AND SIGNALING DEVICE

Application filed January 8, 1916, Serial No. 70,922. Renewed November 10, 1927.

This invention relates to devices whereby a train or vehicle, upon the occurrence of danger conditions, is compelled to be slowed down or is stopped. Suitable signals also may be included in the equipment to indicate, to the engineer or driver, existing conditions.

According to the present invention the desired control is effected by means of magnets distributed along the track, the fields of which induce currents in a train circuit as the train passes the magnets. The magnets are controlled according to the existing conditions so that the induction in the vehicle circuit is varied in response to these conditions and the control exerted accordingly.

The magnets along the track may comprise permanent magnets and also electromagnets, the permanent magnets producing danger conditions in the vehicle circuit while the effect of the electromagnets in association with that of the permanent magnets is to cause the operations in the vehicle circuit to correspond to existing conditions, the electromagnets being controllable according to those conditions.

It is the main object of the present invention to enforce a speed control of the vehicle or train in accordance with conditions as impressed upon the track magnets and inductively transferred to the vehicle circuit.

It is a further object of the invention to provide means for bringing the train or vehicle to a stop in case the engineer or driver does not heed the conditions of the track magnets as inductively transferred to the vehicle circuit.

A further object of the invention is to provide means for causing the stopping of the train in case of derangement or failure to operate of the controlling apparatus upon the vehicle.

Other and ancillary objects of the invention will appear hereinafter.

In the accompanying drawings, which illustrate the invention,

Fig. 3 is a side elevation showing details, of a speed indicating and controlling apparatus as will be hereinafter referred to.

Fig. 4 is a side elevation showing details, of a worm operated switch as will be hereinafter referred to.

Referring to the drawings, and first to Figs. 1 to 6 inclusive, 13 and 14, A and B indicate the rails usual to railroad tracks, upon which the vehicle or train runs. The track is divided into blocks by means of electrical insulation as at C, D and E. Across the rails in each block are respectively connected batteries as F, G and H. Also connected across the rails in each block are respective track relays as S, T and U. Normally the track relay of a block is energized by its battery and maintains its contacts closed. When, however, the battery is short circuited by a vehicle on the rails within the block, the relay will let go and its contacts will open.

Figure 2:
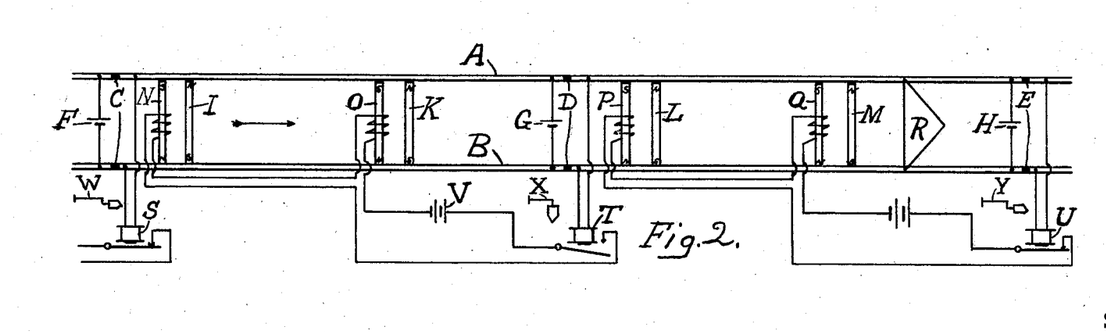
Fig 2 is a diagrammatic view showing the arrangement of track magnets and circuits.
Figure 3:
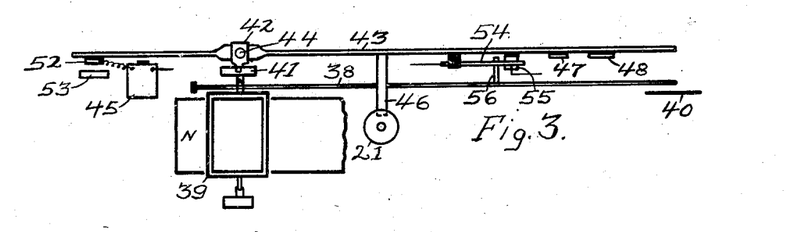
Figure 4:
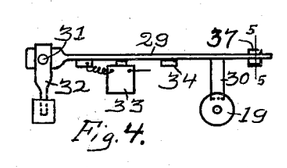
Figure 5:
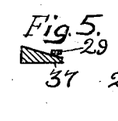
Fig. 5 is a section on the line 5—5 of Fig. 4.
Figure 6:
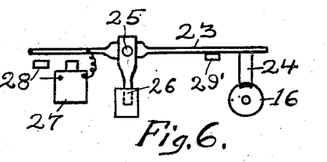
Fig. 6 is a side elevation showing details, of another worm operated switch.

The track relay of each block, as T, has its contacts in a circuit including the coils of electromagnets as N and O of the preceding block, and a battery such as V. So long as the track relay contacts are closed the electromagnets are energized and are deenergized with the deenergizing of the track relay and opening of its contacts. The track relays may also be used to operate wayside semaphores such as W, X and Y in a well known manner.

Similarly the block succeeding that having the electromagnets N and O has the electromagnets P and Q and so on. Each of the electromagnets is succeeded by a permanent magnet such as I, K, L, M etc. Care should be taken to suitably insulate the cores of the magnets from the rails so that they will not form short circuits between the rails. Also, succeeding magnets have their polarities reversed; that is, the north of an electromagnet and the south pole of its succeeding permanent magnet are on the same side of the track.

R represents a vehicle on the track.

The magnetic fields of the electro and permanent magnets along the track act inductively upon a circuit carried by the vehicle as it passes the magnets, whereby to signal the engineer or driver upon the vehicle and to enforce reduction of speed or stoppage of the vehicle under certain conditions of danger as will be hereinafter more fully referred to.

Figures 7, 13, 14:
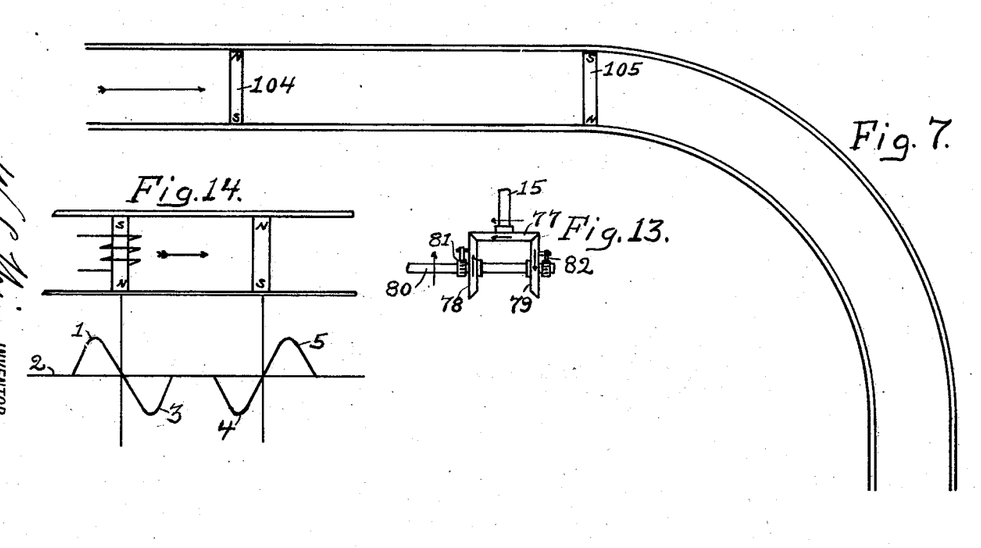
Fig. 7 is a diagram showing a track curve and arrangement of magnets for compelling slowing down on approaching the curve.
Fig. 13 shows details of a uni-directional drive.
Fig. 14 is an enlarged view of a section of the track together with curves showing the electromotive forces induced in the vehicle circuit as the vehicle passes the magnets.

As the vehicle circuit enters through the field of an electromagnet it will have an impulse generated as indicated by the loop 1 of the curve shown in Fig. 14. As it passes out of the field an opposite undulation of electromotive force will be induced as indicated by the loop 3, of the electromotive force curve. As the vehicle circuit enters through the field of the following permanent magnet an undulation 4 will be generated which is the opposite to the first undulation generated on entering the field of the electromagnet. This is because the polarity of the permanent magnet is reversed with relation to that of the electromagnet as above noted. As the vehicle circuit passes out of the field of the permanent magnet an undulation 5 of electromotive force will be generated which is opposite in sign to the undulation 4.

It may here be stated that the electro and parmanent magnets should be spaced sufficiently far apart along the track so that their fields will not become confused but distinct undulations as described will be formed. Otherwise the spacing may be any that is desired.

The arrows in Figs. 2 and 14 indicate the direction of movement of the vehicle along the track.

Figure 1:
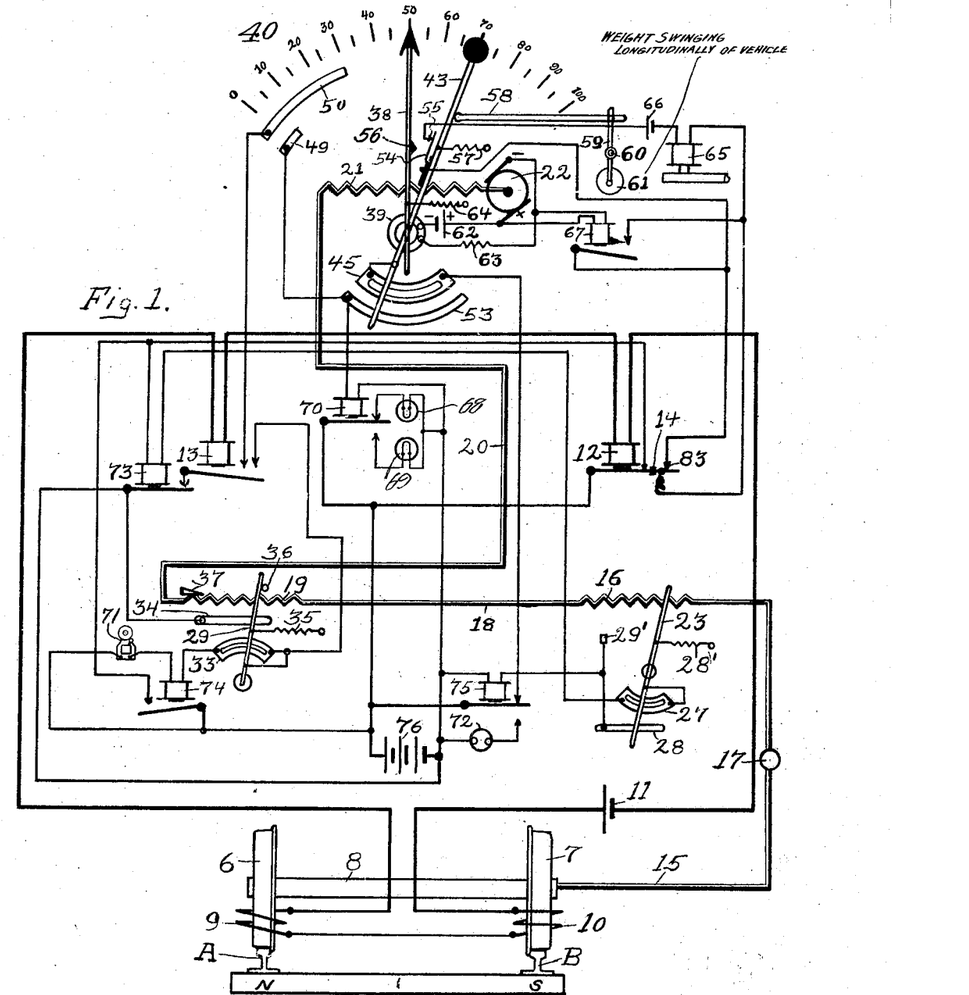
Fig. 1 is a diagram of vehicle controlling circuits and apparatus.

Turning now to Fig. 1, the circuits and apparatus upon the vehicle may be considered. The usual car wheels 6 and 7 connected together by the axle 8 rest upon the rails A and B.

As the wheels enter the field of a magnet the lines of force will traverse the wheels and axle threading the coils 9 and 10 which surround the wheels and, as the lines of force within these coils vary, electromotive force will be generated therein. The coils 9 and 10 are so constructed and arranged that these electromotive forces will act in conjunction with each other so that the total induced electromotive force acting upon the vehicle circuit will be equal to the sum of the electromotive forces induced in these coils.

The coils 9 and 10 are connected in circuit with a battery 11 and relays 12 and 13, the relay 12 controlling two sets of contacts insulated from each other by the insulation 14 in the relay tongue. The battery 11 is so connected in circuit that it will act in conjunction with the first undulation of electromotive force produced by passage over an energized electromagnet.

From the axle 8 is driven a flexible shaft 15 which drives the worm 16 through a unidirectional transmission device 17 which always drives the worm 16 in the same direction regardless of the direction of rotation of the axle 8 and shaft 15. The worm 16 drives the worm 19 through a suitable drive shaft 18 and the worm 19 in turn drives the worm 21 through a suitable drive 20. The last mentioned worm is connected in driving relation to a generator 22. By thus arranging the generator at the end of the series of driven parts as indicated, any break in connections anywhere along the line by which any of the driven parts would fail to operate, would become apparent at once by the failure of the generator 22 to produce voltage. This would result in the application of the brakes and stoppage of the train at the first magnet encountered for reasons which will hereinafter appear.

The device comprising the worm 16 (see Fig. 6) includes an arm 23 pivoted at 25 to permit the driving projection 24 for the arm to be moved into and out of engagement with the worm 16. The pivoting at 26 of the bracket in which the arm 23 is pivoted permits movement of that arm in a plane substantially parallel to the axis of the worm. Acting upon the tail of the arm 23 is an electromagnet 27 which, when energized, depresses the tail and disengages the arm from the worm. A spring 28' tends to hold the arm in engagement with the worm and also to retract it to the right (see Fig. 1) when it is disengaged from the worm by the electromagnet. A stationary contact 28 is so positioned that it contacts with the tail of the arm 23 when the latter is depressed. Also a stationary contact 29' is so placed as to engage the arm 23 when it is in engagement with the worm near the left hand end of its travel (see Fig. 1).

The apparatus including the worm 19 (see Figs. 4 and 5) comprises an arm 29 pivoted at 31 to permit movement toward and away from the worm so that the driving projection 30 of the arm may be moved into and out of engagement with the worm. The pivot 31 is in a bracket pivoted at 32 which permits the arm 29 to turn in a plane perpendicular to its movement about the pivot 31. The projection 30 is held in engagement with the worm by means of the energized magnet 33 when energized, the arm 29 under such conditions being held in engagement with a contact 34. A spring 35 (see Fig. 1) tends to retract the arm 29 toward the right hand against a stop 36 and also exerts an outward pull disengaging it from the worm. At the left hand end of the worm is a cam 37 which engages with the arm 29 when near the end of its left hand travel and forces it out of engagement with the worm, breaking the contact at 34 (thereby deenergizing the magnet 33 as will later appear). The spring 35 then retracts the arm as described.

The apparatus including the worm 21 (see Fig. 3) comprises a needle 38 fixed to the movable element 39 of a d'Arsonval type of instrument so as to be in reality a volt meter needle. This needle moves over a dial 40 which, however, is calibrated to read in speed, such as miles per hour, as such terms express the conditions of prime importance in connection with this application of such apparatus. One end of the movable element of the volt meter is pivoted in a bridge 41 in the usual manner. Also pivoted in this bridge is a bracket 42 carrying a pivoted stop arm 43. The stop arm may thus be turned in planes at right angles to each other. It may be turned about the pivot 44 by means of an electromagnet 45 which pulls down upon the tail of the stop arm when it is energized. Also the stop arm carries a projection 46 adapted to be moved out of and into engagement with the worm 21 as the magnet 45 is energized and deenergized. The stop arm also carries contacts 47 and 48 adapted to respectively engage with the stationary contacts 49 and 50 located at the left hand side of the dial as viewed in Fig. 1. The tail of the stop arm also carries a contact 52 adapted to engage with the stationary contact 53 when the tail is drawn down by energizing of the magnet 45. Also the stop arm carries a circuit closer comprising the spring contact 54 insulated from the arm and normally bearing against the contact 55 to maintain the circuit closed. The indicator needle 38 carries a projection 56 adapted to come against the contact 54 when they are brought into proximity and press it away from the contact 55 so as to open the circuit.

The stop arm is drawn to the right as viewed in Fig. 1 by means of a spring 57 which not only retracts the arm along the dial as described, but also tends to hold it in engagement with the worm. The set position of the arm on the right hand side is defined by a stop rod 58 against the end of which abuts the stop arm 43. This stop rod 58 is swung back and forth, so as to change the initial position of the stop arm 43, by means of a lever 59 pivoted to the rod 58 and also pivoted at 60. At its end the lever 59 carries the weight 61 which may swing to the right or left about the pivot 60 according to the inclination of the vehicle in which it is mounted. This shifting of the weight 61 will shift the setting of the stop arm 43 and it is so placed in the vehicle that the plane of its turning is parallel to the direction of movement of the vehicle i. e. the pivotal axis 60 is transverse to the direction of movement of the vehicle. When therefore the vehicle is going up grade, the weight 61 will swing in one direction and when it is going down grade the weight will swing in the opposite direction. This will cause a corresponding extension or retraction of the setting point of the stop arm 43. The setting of the stop arm 43 controls the distance through which the train may move without being brought to a stop (provided the engineer heeds his warnings as a condition of danger is passed), and the braking distance of a train being greater on down grade than on up grade or on a level, the setting device is so adjusted that on down grade the swing of the weight 61 will move the initial set point of the stop arm further to the right as viewed in Fig. 1, while a swing of the weight in the opposite direction on up grade will move the stop arm set point to the left. On the level the weight will occupy a mid-position and the set point will occupy a position mid-way between the up and down positions.

The voltmeter having the movable element 39, is connected across the terminals of the generator 22 in series with a battery 62 and a high resistance 63, the voltage of the battery being opposed to that of the generator. The generator, as has been noted, is driven from the vehicle axle so that its electromotive force is proportional to the speed. The battery 62 is of an electromotive force such that no speed of the train will cause the electromotive force of the generator to exceed it. The result is that with no electromotive force delivered by the generator, that of the battery will cause the needle 38 to be thrown to the extreme left hand position against the tension of the spring 64. With the generator in operation the resultant electromotive force acting upon the voltmeter coil will be reduced equal to that of the battery minus that of the generator. In other words the torque exerted upon the needle will be reduced by the amount of the generator voltage and it will be proportionally drawn to the right by the spring 64. The position of the needle will therefore depend upon the voltage of the generator which is proportional to the vehicle speed as above mentioned. With the vehicle at rest the needle will occupy its extreme left hand position (see Fig. 1), it will move toward the right proportionally to the speed of the vehicle and if for any reason the circuit through the battery and generator should be interrupted the spring will immediately move the needle to the right opening the circuit between the contacts 54 and 55 and applying the brakes. The uni-directional driving mechanism 17 may be constructed as shown in Fig. 13. A bevel gear 77 is fixed to the driving shaft 15 and meshes with two bevel gears 78 and 79 mounted loosely on the driven shaft 80 so that they may turn thereon. One of the latter gears always rotates in the desired directions and they are provided with ratchet and pawl connections 81 and 82 each arranged to form driving engagement in the desired direction but the pawl of each slipping over its ratchet teeth on reverse rotation.

The apparatus also comprises the normally energized air brake control magnet 65 in circuit with a battery 66, the circuit being controlled by the contacts 54 and 55 before referred to. A relay 67 connected across the terminals of the generator 22 serves, when energized, to close the circuit of the magnet 65 independently of the contacts of the relay 12. This magnet 67 serves as tell tale as to whether or not the generator 22 is properly generating. If it is not generating the circuit of the air magnet 65 will be opened and the brakes immediately applied when the relay 67 lets go, this on the assumption that the relay 12 is then in its retracted position.

The apparatus also comprises visual clear and danger signals 68 and 69 such as green and red lamps with a controlling relay 70; also an audible clear signal such as the bell 71 and an audible danger signal as the horn 72, together with controlling relays 73, 74 and 75 and a battery 76, the functions of which will more fully appear from the following consideration of the operation of the apparatus.

The operation may be traced as follows:

In the condition as shown in Fig. 1, the stop arm 43 is set at the desired maximum speed, in this case indicated as seventy miles per hour. The vehicle is at rest hence the generator 22 produces no voltage; consequently the relay 67 is deenergized. The circuit of the magnet 65 is however made through the battery 66 and the contact 83 of the relay 12. The magnet 65 is thus energized and maintains the air in condition to hold the brakes off subject to the control of the engineer's valve. The relays 12 and 13 are in a closed circuit including the battery 11 and the wheel coils 9 and 10. The relay 13 is so proportioned that it will not lift under battery current while relay 12 will lift. The relay 75, magnet 27 and relay 73 are energized, being connected in series across the battery 76 through the following circuit:—beginning at the positive terminal of battery 76, relay 75, contact 28—23, magnet 27, relay 73, front contact of relay 12, and back to the battery 76. Said relays therefore are picked up and the arm is held clear of the worm 16 and retracted by its spring to its right hand limit. The relay 73 closes no circuit as it connects with the tongue of relay 13 whose contacts are open. The relay 75 closes circuit at its forward contact from one side of the battery 76 through the magnet 45, the arm 43, contact 53 and the relay 70 to the other side of the battery. The arm 43 will thus be held clear of the worm and retracted to the right against the stop rod 58 by the spring 57, and circuit of the clear light 68 will be closed through the forward contact of the relay 70. The circuit through the magnet 33 is broken at the relay 13 and also at the contact 34. The arm 29 is therefore pulled clear of the worm 19 and retracted against the right hand stop 36. The generator delivering no voltage, the full voltage of the battery 62 will be exerted upon the coil 39 and the torque produced is sufficient to turn the needle 38 to the zero position at the left. It may be stated here that the resistance 63 is so high that it prevents the battery 62 from supplying sufficient current to the relay 67 to operate it. So long as no track magnets acting inductively on the vehicle are encountered, the engineer may start and stop his engine, and control its speed as desired provided he does not allow the speed to become excessive. As the train starts up the generator 22 picks up and lifts the relay 67. Also it opposes its voltage to that of the battery 62 so that the torque on the needle 38 is reduced and it is accordingly drawn to the right by its spring. If the speed is allowed to equal that for which the stop arm 43 is set, the needle will engage the contact 54 and open the circuit of the magnet 65 thereby causing the air valve to open and the brakes to be applied.

If the vehicle is passing along a clear block, that is one with no vehicle in the block ahead, it will first encounter the field of an electromagnet. As the wheels carrying the wheel coils 9 and 10, pass through this field there will be induced in those coils positive and negative alternations of electromotive force as indicated at 1 and 3 in Fig. 14. The coils and battery 11 are so relatively connected that the first-encountered positive undulation reinforces the electromotive force of the battery. This produces an increased pull in the relay 12 which effects no change. The relay 13 is however sufficiently strengthened to pick up. This closes circuit through the bell 71, relay 74, magnet 33 and forward contacts of relays 13 and 73 across the battery 76. The ringing of the bell notifies the engineer that conditions are clear. The closing of the contacts of relay 74 establishes a circuit for the relay 73, which may be traced as follows:— beginning at the positive side of battery 76, relay 75, contacts 28—23, magnet 27, relay 73, front contact of relay 74, back to the battery 76. The energized magnet 33 draws the arm 29 into engagement with its worm and establishes circuit for the relay 74 and magnet 33 by engaging with the contact 34, this circuit being independent of the relays 13 and 73. The arm thereupon begins its travel to the left along the worm, maintaining contact with the contact 34 throughout its travel. As the coils 9 and 10 leave the field of the electromagnet, however, an opposite undulation as indicated at 3 in Fig. 14, will be induced and this, being in opposition to the voltage of the battery 11, the electromotive force of the circuit including relays 12 and 13 will be reduced. The relays 12 and 13 will then let go but this will produce no change as the circuits broken at their contacts have been otherwise made as above traced with the exception that if for any reason the generator 22 has ceased to produce voltage the letting go of the relay 12 will open the remaining circuit of the brake magnet 65, immediately applying the brakes.

The coils 9 and 10 passing on into the field of the succeeding permanent magnet, a negative undulation similar to that produced on withdrawing from the field of the electromagnet will be produced. This, however, will not cause any change in the vehicle circuit. Its tendency is to cause the relays 12 and 13 to let go.

Passing on out of the field of the permanent magnet an opposite undulation 5 (Fig. 14) will be produced. This again reinforces the voltage of the battery 11, causing the relay 13 to pick up the relay 12 being already up, it having been dropped and again picked up by current derived from the car battery 11 but this produces no effect as the circuits closed thereby were previously closed as above indicated.

The arm 29 continues its movement toward the left until it is wedged away from the contact 34 and out of the worm by the wedged shaped cam 37 at the left hand end of the worm. The arm is then immediately retracted by the spring 35. Also the circuit of the magnet 33, relay 74, and bell 71 will be broken, the relay 13 having dropped in the mean time, rendering impossible the closure of the pick-up circuit for magnet 33. The relay 74 will let go and the parts will return to their normal condition in which same were found before the field of the electromagnet was encountered.

If, however, the vehicle is assumed to be entering the block of Fig. 2, just preceding the block containing the vehicle R, it will be seen that a danger condition will exist in the block being entered, the electromagnets being deenergized. As the vehicle under consideration passes along the block, it will first encounter the field of a permanent magnet i. e. an undulation as 4 (Fig. 14) will be first induced in the coils 9 and 10. This is in opposition to the voltage of the battery 11 and will cause the relay 12 to let go, the relay 13 remaining open. The opening of the relay 12 breaks the circuit of the relay 73 the magnet 27 and the relay 75 which are connected in series across the battery 76. Thereupon circuit is made through the back contact of the relay 75 through the horn 72 which sounds a danger signal. It will be seen that the tongue of the relay 73 is adapted when it is lifted to establish a connection of the tongue of the relay 13 with one terminal of the battery 76. Under such circumstances, when the tongue of the relay 13 is in lifted position, it will connect this battery terminal with those contacts with which it, the tongue, engages. When, therefore, the relay 73 lets go upon the breaking of its circuit at the contacts 23—28 of magnet 27, as just described, the battery connection just referred to with the tongue of the relay 13 will be broken, relay 73 being down; so that while the tongue of the relay 13 will be lifted on the succeeding undulation, it will not connect the battery terminal referred to with the contacts with which it engages because this battery connection has already been broken at the contacts of the relay 73. The arm 23 will be moved into engagement with its worm by the spring 28' and begin its travel toward the left.

The succeeding undulation 5 (Fig. 14) produced as the vehicle coils move out of the field, is in conjunction with the voltage of the battery 11 and causes the relays 12 and 13 to pick up. The lifting of the relay 12, however, has no effect as the circuit which it closes is broken at the contact 28. The lifting of the relay 13 also produces no effect at this time as the battery connection to its tongue is broken.

The letting go of the relay 75 as noted above breaks the circuit at its forward contact, of the magnet 45 which lets go the arm 43. This arm thereupon is drawn into engagement with the worm 21 by the spring 57. Also this movement of the arm breaks the circuit of the relay 70 at contact 53. The relay 70 then lets go, breaks the circuit of the clear light 68 and closes the circuit of the red danger light 69 across the battery 76.

The arm 43 now starts upon its travel to the left along the worm 21 and if the engineer is to prevent the application of the air brakes and stoppage of the train, he must reduce his speed so that the indicator needle 38 will be kept out of the way of the arm 43. Otherwise all the circuits of the brake magnet 65 will be broken and the brakes applied.

As the danger condition continues and the speed has been reduced to a small amount, say five miles per hour, the arm 43 will engage with a contact 49 thereby closing circuit from one side of the battery 76 through the relay 70, contact 49, arm 43, magnet 45 and tongue of relay 75 to the other side of the battery. The relay 75 has picked up during the travel of the arm 23 by reason of having its circuit established through the contact 29'. This circuit for relay 75 may be traced as follows:—beginning at the battery 76, relay 75, contacts 28—23, magnet 27, relay 73, front contact of relay 12, back to the battery 76. The pitch and length of the worm 16 is such that it will cause the arm 23 to engage the contact 29' well within the braking distance. In fact, the travel of the arm 23 is simply sufficient to assure that the circuit for relay 73 is open during the second wave of the cycle of alternating current generated by the permanent track magnet (see Fig. 14). That is, the first wave of the cycle of alternating current generated in the coils 10 upon passage of the vehicle over a permanent magnet causes current to flow in a direction to neutralize the current from battery 11 and effect dropping of the relay 12. Dropping of relay 12 de-energizes magnet 27, effecting opening of contacts 23—28 and in turn dropping of relay 73. The second wave of this cycle of alternating current, although it effects picking up of relay 13 produces no result in that relay 73 is still down, this relay 73 being held deenergized for a distance of travel determined by worm 16 and sufficient to assure that the relay 13 (picked up by the second wave) has again dropped. The worm 19 is so proportioned that the arm 29 remains in engagement until after it has travelled a certain distance, in this case until the permanent magnet has been passed. The circuit of the relay 75 just referred to, is made through the contact 29', arm 23, magnet 27 and relay 73 through the tongue of the relay 12. The lifting of the relay 73, however, will not effect any change as the relay 13 has dropped at the end of the first wave of the alternating current cycle generated in the coils 10 upon passage of the wheels and axle over an electromagnet N. The energizing of the magnet 27, however, restores the arm 23 and maintains circuit through relay 73, magnet 27 and relay 75, and including the contact 28 after leaving the contact 29'.

The circuit of the magnet 45 having been completed as described, the arm 43 will be restored and also the relay 70 being energized the circuit of the clear green light 68 will be restored. The circuit of the danger horn 72 has already been broken as noted.

At any desired point, for instance as indicated in Fig. 1, at a point corresponding to 30 miles per hour, the arm 43 establishes contact with a stationary contact 50. In this condition, if danger conditions have disappeared since the apparatus was set into operation by the danger conditions as described, the next field encountered will be such as to produce undulations in the vehicle circuit as indicated at 1 and 3 in Fig. 14. This first undulation reinforces the voltage of battery 11 causing the picking of the relay 13. A circuit will thereupon be established, through the bell 71, relay 74, magnet 33, contacts of relay 13, and contacts of relay 73, back to battery 76. Similarly another circuit will be established, starting at battery 76, contacts of relay 75, magnet 45, arm 43, contact 50, contacts of relay 13, contacts of relay 75, back to battery 76. It is of course understood that the relay 12 has not yet dropped, the wave 1 shown in Fig. 14 only having transpired thus far, so that the relays 75 and 73 and the magnet 27 are still assuming their energized position. The engineer will therefore get a clear bell signal, the magnet 45 will cause the restoration of the arm 43 and the arm 29 will be thrown into engagement with its worm. The succeeding undulation (see 3 of Fig. 14) will release the relay 13 and the arm 29 will travel along its worm until wedged therefrom by the cam 37, breaking contact at 34. The apparatus will then be reset permitting the operation of the train at the will of the engineer (within certain limits as above referred to) and in readiness for operation in accordance with clear or danger conditions as described.

Figure 8:
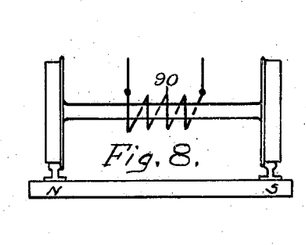
Fig. 8 is an elevation of a pair of vehicle wheels and their connecting axle showing a modified arrangement of the vehicle coil inductively acted upon by the track magnets.
Figure 9:
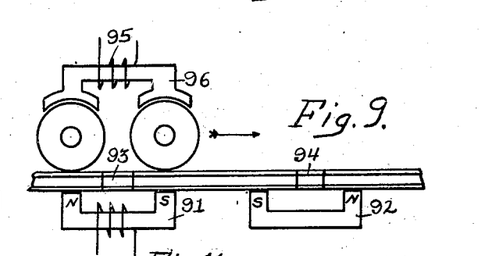
Fig. 9 is a side elevation of a vehicle truck and track showing a modified arrangement of the vehicle coil and also a modified arrangement of the track magnets.
Figure 11:
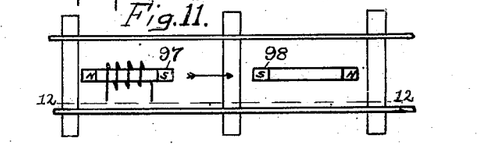
Fig. 11 is a plan of the track showing another manner of arranging the track magnets.
Figure 12:
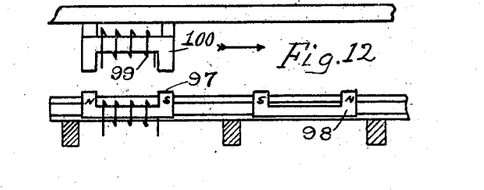
Fig. 12 is a section on the line 12—12 of Fig. 11, also showing in elevation an arrangement of the vehicle coil on the car.

Referring now to Fig. 8, the inducing coil 90 is shown as enveloping the axle instead of the wheels and many other dispositions of the inducing coils on the vehicle might be made. Otherwise the vehicle circuits may be the same as previously described. In Fig. 9 instead of having the magnets transverse to the track as shown in Fig. 2 they may be arranged longitudinally of the track as shown in Fig. 9. The electromagnet in this case is shown at 91 and the permanent magnet at 92, their polarities being reversed as shown and manganese sections of rail 93 and 94 interposed between the poles of each magnet. In this figure also the inducing coils of the vehicle circuit are shown as mounted upon yokes as 96 extending between the wheels. Another arrangement is shown in Figs. 11 and 12 wherein the magnets extend longitudinally of the track but are located mid-way between the rails, 97 representing the electromagnet and 98 the permanent magnet, their polarities being reversed as shown. The inducing coil as 99 on the vehicle may be mounted on a magnetic yoke 100 suspended from the bottom of the car and adapted to pass over the electro and permanent magnets installed in the track.

Figure 10:
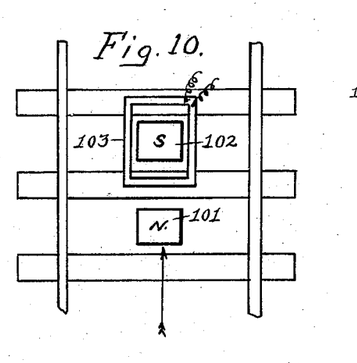
Fig. 10 is a diagram showing the track in plan with a modified arrangement of track magnets.

Fig. 10 is a view wherein the location of the magnets is similar to that shown in Figs. 11 and 12 but instead of having both poles of the magnet exposed to act upon the car circuit, the succeeding magnets expose a north pole of one and a south pole of the other. In this figure 101 represents an electromagnetic pole and 102 the permanent magnet pole while 103 indicates the coil mounted on the car in which electro-motive force is induced by the magnets.

Referring now to Fig. 7, it is well known that the vehicle should slow up on approaching a curve. Accordingly, at a suitable distance from the curve, a magnet 104 is installed having its polarities such that as a vehicle passes over it there will be induced in the vehicle circuit a cycle as indicated by the loops 4 and 5 of Fig. 14. This will create an artificial danger condition as will compel the engineer to slow down his train as before described. Just before reaching, or at the curve, is placed a magnet 105 with polarity reversed as regards the magnet 104. Upon encountering the field of this magnet the danger condition will be cleared up and the engineer permitted to speed up again.

The worm 21 is so constructed that the stop arm 43 will be moved along it at such rate that the engineer, by reducing his speed within permissible or desirable braking limits, may keep the needle or pointer 38 out of the way of the stop arm to avoid breaking the circuit of the brake magnet 65. Also this worm should be so constructed as to move the stop arm in such manner as to require the vehicle speed to be reduced (in order to keep out of the way of the stop arm) so that this speed will be reduced to the desired limit within a predetermined distance of the travel of the vehicle.

While the invention has been illustrated in what is considered its best application, together with certain modifications, it may be embodied in other structures without departing from its spirit, and is not, therefore, limited to the structures shown in the drawing.

What I claim is:—

1. The combination with a track, of a vehicle movable along the same, magnets along the track, a circuit on said vehicle adapted to have electro-motive force induced in it by said magnets, means set in operation by said electromotive force and continuing in operation after the cessation of said electromotive force, tending to influence movement of the vehicle and means controlled by the speed of the vehicle for preventing the exercise of said influence.

2. The combination with a track, of a vehicle movable along the same, magnets along the track, a circuit on said vehicle adapted to have electromotive force induced in it by said magnets, means controlled jointly by said electromotive force and the speed of the vehicle and operable at different speeds to control the vehicle for exerting a controlling influence on the movement of the vehicle, and means for controlling the magnets according to track conditions.

3. The combination with a track, of a vehicle movable along the same, magnets along the track, a circuit on said vehicle adapted to have electromotive force induced in it by said magnets, a brake circuit and means controlled jointly by said electromotive force and the speed of the vehicle and operable at different speeds to control said brake circuit.

4. The combination with a track, of a vehicle movable along the same, magnets along the track, a circuit on said vehicle adapted to have electromotive force induced in it by said magnets, a brake circuit means controlled jointly by said electromotive force and the speed of the vehicle and operable at different speeds to control said brake circuit, and means for controlling the magnets according to track conditions.

5. The combination with a track, of a vehicle movable along the same, magnets along the track, a circuit on said vehicle adapted to have electromotive force induced in it by said magnets for controlling the movement of the vehicle, a train of mechanism driven from a moving part of said vehicle for controlling the movement of said vehicle, and means for stopping said vehicle if said mechanism fails to operate.

6. The combination with a track, of a vehicle movable along the same, a brake circuit, contact mechanism controlling said brake circuit, and tending to place the brakes in operation, other contact mechanism controlling the movement of the vehicle, a train of mechanism driven from a moving part of said vehicle for operating said other contact mechanism and means for opposing the tendency of the first mentioned contact mechanism, said opposing means being also operated by said train of mechanism whereby the failure of said train to drive said other contact mechanism will remove opposition to the application of the brakes.

7. The combination with a track, of a vehicle movable along the same, magnets along said track, a circuit on said vehicle adapted to have electromotive force induced in it by said magnets, a stop arm, means driven from a movable part of the vehicle for driving said stop arm, means controlled by said electromotive force for controlling the engagement of said stop arm with its said driving means, a member positioned according to the speed of said vehicle, and a brake circuit controlled by the relative position of said stop arm and member.

8. In an automatic train control system, the combination with a vehicle and a track therefor divided into blocks by insulating joints, a normally closed track circuit for each block including a normally energized track relay, normally energized train control apparatus on the vehicle, a normally energized stick device having a pick-up and a stick circuit for controlling said apparatus, separate responsive devices on the vehicle responsive to influences transmitted from the trackway for controlling said pick-up and said stick circuit respectively, and separate impulse transmitting devices associated with each block and acting to control said respective responsive devices separately through an intervening air gap.

9. In an automatic train control system, the combination with a track divided into blocks each having a normally closed track circuit including a normally energized track relay, a railway vehicle, train control apparatus carried on said vehicle, a stick electro-responsive device on said vehicle having a pick-up circuit and a stick circuit, a permanent magnet associated with each block acting through an intervening air gap to break said stick circuit, a coil associated with said permanent magnet for modifying the effect of said permanent magnet, a control circuit for said coil controlled in accordance with the condition of the track relay of the block next in advance, and an electromagnet near the exit end of each block controlled in accordance with the condition of the track relay of the block next in advance and acting through an intervening air gap when energized to close said pick-up circuit.

10. In an automatic train control system, the combination with a track divided into blocks each having a normally closed track circuit including a normally energized track relay, a railway vehicle, train control apparatus carried on said vehicle, a stick electro-responsive device on said vehicle having a pick-up circuit and a stick circuit, a permanent magnet associated with each block acting through an intervening air gap to break said stick circuit, electrically controlled means associated with said permanent magnet for modifying the effect of said permanent magnet, a control circuit for said electrically controlled means controlled in accordance with the condition of the track relay of the block next in advance, and an electromagnet near the exit end of each block controlled in accordance with the condition of the track relay of the block next in advance and acting through an intervening air gap when energized to close said pick-up circuit.

11. In an automatic train control system, the combination with a vehicle and a track therefor divided into blocks by insulating joints, a normally closed track circuit for each block including a normally energized track relay, a normally energized stick electro-responsive train control device on the vehicle having a pick-up circuit and having a stick circuit including a contact operated by said device and closed when said device is energized, a normally de-energized relay on the vehicle which when energized closes said pick up circuit, a normally energized relay on the vehicle having a normally closed contact included in said stick circuit, influence communicating means along the track inherently active to transmit a control influence to the vehicle inductively to de-energize said normally energized relay, and other influence communicating means along the track way inherently inactive but rendered active if the track relay of the next block in advance is energized to inductively transmit a control influence to said vehicle to energize said normally de-energized relay.

12. In an automatic train control system the combination with a vehicle and a track therefor divided into blocks by insulating joints, a normally closed track circuit for each block including a normally energized track relay, a normally energized stick electro-responsive train control device on the vehicle having a pick-up circuit and having a stick circuit including a contact operated by said device and closed when said device is energized, a normally de-energized relay on the vehicle which when energized closes said pick-up circuit, a normally energized relay on the vehicle having a normally closed contact included in said stick circuit, a permanent magnet along the track inherently active to transmit a control influence to the vehicle inductively to de-energize said normally energized relay, and an electro-magnet along the trackway inherently inactive but rendered active if the track relay of the next block in advance is energized to inductively transmit a control influence to said vehicle to energize said normally de-energized relay.

13. In an automatic train control system, the combination with a vehicle and a track therefor divided into blocks by insulating joints, a normally closed track circuit for each block including a normally energized track relay, a normally energized stick electro-responsive train control device on the vehicle having a pick-up circuit and having a stick circuit including a contact operated by said device and closed when said device is energized, a normally de-energized relay on the vehicle which when energized closes said pick-up circuit, a normally energized relay on the vehicle having a normally closed contact included in said stick circuit, influence communicating means along the track inherently active to transmit a control influence to the vehicle inductively to de-energize said normally energized relay, other influence communicating means along the trackway inherently inactive but rendered active if the track relay of the next block in advance is energized to inductively transmit a control influence to said vehicle to energize said normally de-energized relay, cab signal means rendered active in response to energization of said normally de-energized relay, and other cab signal means rendered active in response to de-energization of said normally energized relay.

14. Car-carried apparatus for automatic train control systems comprising, a brake control device, a speed responsive device operated by the wheels of the vehicle, means for controlling said brake control device in accordance with traffic conditions ahead and the indicating condition of said speed responsive device, said speed responsive device including means for generating a voltage in accordance with the speed of the car, and means for checking the operativeness of said speed responsive device.

15. An automatic train control system comprising, a brake control device on the vehicle, speed control means for rendering said brake control device active if the speed of the vehicle is excessive, control means for determining the speed limit imposed by said speed control means, means for actuating said control means to restrict the speed of the train in response to an inductive control influence transmitted from the trackway, a visual signal rendered active so long as said control means is in its actuated condition, and an audible signal rendered active for an interval of time only upon actuation of said control means.

16. An automatic train control system comprising, a brake control device, speed controlled means for controlling said device, and means for changing the speed limit imposed by said speed controlled means in accordance with the acceleration and deceleration of the train.

17. An automatic train control system comprising, a brake control device, speed controlled means for controlling said device, and means for changing the speed limit imposed by said speed controlled means in accordance with the degree of grade the train is climbing or descending.

18. In an automatic train control system, the combination with a vehicle and a track therefor divided into blocks by insulating joints, a normally closed track circuit for each block including a normally energized track relay, normally energized train control apparatus on the vehicle, a normally energized stick device having a pick-up and a stick circuit for controlling said apparatus, separate responsive devices on the vehicle responsive to influences transmitted from the trackway for controlling said pick-up and said stick circuit respectively, an impulse transmitting device associated with each block controlled by the track relay of the block next in advance and acting to control through an intervening air gap the responsive device which controls said pick-up circuit, and means along the track at permanent hazards continuously active for transmitting a control influence to the responsive device which controls said stick circuit.

19. In an inductive train control system, a trackway having a section necessitating restricted vehicle speeds, vehicle control mechanism including means for controlling the speed of the vehicle, inductive means at one end of said track section for operating the vehicle mechanism independent of traffic conditions to impose a speed restriction on said vehicle, and inductive means at the other end of said track section for operating the said mechanism independent of traffic conditions to relieve said restriction.

20. In an inductive train control system, a trackway having a section necessitating restricted vehicle speeds, vehicle carried mechanism including means for controlling the speed of the vehicle, instrumentalities adapted to be inductively influenced for operating the said means, and roadside mechanism including inductors spaced a distance apart corresponding to the length of said section for influencing the said instrumentalities independent of traffic conditions to impose the speed restriction and to then relieve said restriction.

21. In an inductive train control system, a trackway having a section necessitating restricted vehicle speeds, vehicle carried mechanism including means for controlling the speed of the vehicle, instrumentalities adapted to be inductively influenced for operating the said means, and roadside mechanism including inductors spaced a distance apart corresponding to the length of said section for reversely influencing the said instrumentalities independent of traffic conditions to impose the speed restriction and to then relieve said restriction.

Signed at New York city, in the county of New York, and State of New York, this 6th day of January, A. D. 1916.

WILLIAM C. NEIN.